US011356403B2

(12) United States Patent
Stephenson et al.

(10) Patent No.: US 11,356,403 B2
(45) Date of Patent: Jun. 7, 2022

(54) NETWORK SUPPORT FOR LOCALLY OFFLOADED TRAFFIC (71) Applicant: ARRIS Enterprises LLC, Suwanee, GA (US)

(72) Inventors: David Sheldon Stephenson, San Jose, CA (US); Shailender Potharaju, Fremont, CA (US)

(73) Assignee: ARRIS ENTERPRISES, LLC, Suwanee, GA (US)

( * ) Notice: Subject to any disclaimer, the term of this patent is extended or adjusted under 35 U.S.C. 154(b) by 0 days.

(21) Appl. No.: 17/101,194

(22) Filed: Nov. 23, 2020

(65) Prior Publication Data
US 2021/0075760 A1 Mar. 11, 2021

Related U.S. Application Data (63) Continuation of application No. 16/329,756, filed as application No. PCT/US2016/049276 on Aug. 29, 2016.

(51) Int. Cl.
H04L 29/12 (2006.01)
H04L 61/103 (2022.01)
(Continued)

(52) U.S. Cl.
CPC ............ *H04L 61/103* (2013.01); *H04L 45/66* (2013.01); *H04L 61/2007* (2013.01);
(Continued)

(58) Field of Classification Search
CPC ... H04L 61/103; H04L 61/6022; H04L 45/66; H04W 8/06; H04W 84/045; H04W 28/08; H04W 76/11
See application file for complete search history.

(56) References Cited

U.S. PATENT DOCUMENTS 9,686,813 B2 6/2017 Bhatnagar et al.
10,028,327 B2 7/2018 Bhatnagar et al.
(Continued)

FOREIGN PATENT DOCUMENTS

EP 3504900 A1 7/2019
WO 2016010564 A1 1/2016

OTHER PUBLICATIONS

PCT International Search Report and Written Opinion, PCT/US2016/049276, dated Nov. 3, 2016.
(Continued)

*Primary Examiner* — Jamal Javaid
(74) *Attorney, Agent, or Firm* — Steven Stupp; Stewart Wiener (57) ABSTRACT A communication technique for providing a mobile gateway in a radio node (such as an eNodeB) in a local wireless network that is associated with a venue is described. During the communication technique, the radio node may provide, via the mobile gateway, cellular-telephone-network services. In particular, the mobile gateway may implement functions including: providing, when an electronic device attaches to the local wireless network, an Internet Protocol (IP) address to the electronic device based on a media access control (MAC) address for the electronic device, which is, in part, provided by a mobile management entity (MME) in a cellular-telephone network; triggering, via a supported interface, paging to the electronic device when the electronic device is in idle in the local wireless network; transmitting uplink data and receiving downlink data via a cellular-telephone communication protocol (such as Long Term Evolution or LTE); and/or electronic-device mobility in the local wireless network.

20 Claims, 7 Drawing Sheets (51) Int. Cl.
*H04W 76/11* (2018.01)
*H04L 45/00* (2022.01)
*H04L 101/622* (2022.01)
*H04W 8/06* (2009.01)
*H04W 28/08* (2009.01)
*H04W 84/04* (2009.01)
*H04L 61/5007* (2022.01)
*H04W 92/20* (2009.01)
*H04W 36/00* (2009.01)

(52) U.S. Cl.
CPC ........... *H04L 61/6022* (2013.01); *H04W 8/06* (2013.01); *H04W 28/08* (2013.01); *H04W 76/11* (2018.02); *H04W 84/045* (2013.01); *H04W 36/0033* (2013.01); *H04W 92/20* (2013.01)

(56) References Cited

U.S. PATENT DOCUMENTS

| | | | |
|---|---|---|---|
| 2008/0240040 A1 | 10/2008 | Faccin | |
| 2009/0177782 A1* | 7/2009 | Blatherwick | H04L 29/12094 709/228 |
| 2011/0103303 A1 | 5/2011 | Hsu et al. | |
| 2012/0021714 A1 | 1/2012 | Chen | |
| 2012/0039323 A1 | 2/2012 | Hirano et al. | |
| 2012/0196600 A1 | 8/2012 | Mizukoshi | |
| 2012/0214512 A1* | 8/2012 | Siomina | G01S 5/0205 455/456.2 |
| 2012/0282982 A1 | 11/2012 | Mujtaba et al. | |
| 2013/0265997 A1 | 10/2013 | Gu et al. | |
| 2014/0059192 A1* | 2/2014 | Miklos | H04W 8/26 709/221 |
| 2014/0341182 A1 | 11/2014 | Gage et al. | |
| 2015/0117328 A1* | 4/2015 | Llairo | H04L 5/0044 370/329 |
| 2015/0195684 A1 | 7/2015 | Lohmar et al. | |
| 2017/0251505 A1 | 8/2017 | Bhatnagar et al. | |
| 2019/0261445 A1 | 8/2019 | Bhatnagar et al. | |

OTHER PUBLICATIONS

Supplementary Partial European Search Report, Application No. EP 16 91 5350 (dated Feb. 7, 2020).
Canadian Patent Appl. No. 3,064,943, Office Action, dated Feb. 28, 2020.
European Patent Appl. No. 16915350.9, Extended European Search Report, dated Jun. 25, 2020.
Canadian Patent Appl. No. 3,064,943, Office Action, dated Mar. 31, 2021.
"3rd Generation Partnership Project; Technical Specification Group Core Network and Terminals; Numbering, addressing and identification (Release 13)" 3GPP Standard TS 23.003, V13.5.0, dated Mar. 17, 2016.
Office Action for corresponding European Application No. 16915350. 9, 7 pages, dated Nov. 18, 2021.

* cited by examiner

NETWORK SUPPORT FOR LOCALLY OFFLOADED TRAFFIC

CROSS REFERENCE TO RELATED APPLICATIONS

This application is a continuation of U.S. patent Ser. No. 16/329,756, "Network Support for Locally Offloaded Traffic," by David Sheldon Stephenson et al., filed on Feb. 28, 2019, which claims priority under 35 U.S.C. 371 to International Application No. PCT/US16/49276, "Network Support for Locally Offloaded Traffic," by David Sheldon Stephenson, et al., filed on Aug. 29, 2016, the contents of both of which are herein incorporated by reference

BACKGROUND

Field

The described embodiments relate to techniques for communicating information among electronic devices, including implementing network support and device mobility in an enterprise wireless network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

While many electronic devices communicate with each other via large networks owned by a network operator, it is often difficult to communicate via a cellular-telephone network, e.g., in indoor environments. In particular, in indoor environments the network performance (such as the block error rate and the capacity) of the cellular-telephone network can be degraded or not available at all. Moreover, there are often constraints on the number of base stations (and associated cell towers) that implement so-called 'macrocells' in a cellular-telephone network. Consequently, it can be difficult for the operator of the cellular-telephone network (which is sometimes referred to as a 'mobile network operator') to improve the quality of their service e.g., in indoor environments.

SUMMARY

The described embodiments relate to a radio node (such as an eNodeB) that provides cellular-telephone-network services in a local wireless network associated with a venue. (such as an enterprise wireless network). This radio node includes: one or more antenna connectors (which may be connected to an antenna), and an interface circuit that communicates with an electronic device and a set of radio nodes in the local wireless network, and with a cellular-telephone network (such as a packet-data network). During operation, the radio node provides a mobile gateway, the mobile gateway implementing one or more functions including: providing, when the electronic device attaches to the local wireless network, an Internet Protocol (IP) address to the electronic device based on a media access control (MAC) address for the electronic device, which is, in part, provided by a mobile management entity (MME) in the cellular-telephone network; triggering, via a supported interface, paging to the electronic device when the electronic device is in idle or idle mode (i.e., does not have an active connection) in the local wireless network; and/or transmitting uplink data and receiving downlink data via a cellular-telephone communication protocol.

For example, the MAC address may include an identifier associated with the MME and a mobile temporary mobile subscriber identifier (M-TMSI) that is assigned to the electronic device by the MME based on an international mobile subscriber identifier (IMSI) of the electronic device. The MAC address may be maintained by the radio node. Moreover, the paging may be triggered based on the M-TMSI and may be performed by the set of radio nodes.

Note that the IP address may be provided using a Dynamic Host Configuration Protocol.

Moreover, the interface includes an SGi interface or an X2 interface.

Furthermore, the cellular-telephone communication protocol may include Long Term Evolution (LTE).

Additionally, the mobile gateway implements: enforcing quality-of-service policies; and/or supporting lawful intercept of communication with the electronic device.

Note that the mobile gateway may detect duplicate IP addresses and may defend the IP address of the electronic device when the electronic device is in idle in the local wireless network.

In some embodiments, the mobile gateway in the radio node, in conjunction with one or more of the set of radio nodes, provides: a layer 2 (L2) bridge within a subnet in the local wireless network; and/or a layer 3 (L3) bridge across subnets in the local wireless network.

For example, the L2 bridge may involve the radio node: requesting that the electronic device measure a received signal strength (such as a received signal strength indicator or RSSI) associated with another radio node in the local wireless network; receiving information specifying the received signal strength from the electronic device; and providing, via another interface, the MAC address and the IP address to the other radio node, so that the electronic device is handed over to the other radio node. Note that the other interface may include an X2 interface.

Alternatively, during communication of a data stream with the electronic device, the L3 bridge may involve the radio node: providing, via another interface, the MAC address and the IP address to another radio node in a different subnet than that of the radio node in the local wireless network; receiving, from the other radio node, instructions to establish a mobility tunnel with the radio node in a subnet that includes the radio node; and forwarding traffic for the electronic device to the other radio node via the mobility tunnel. Note that the data stream may be associated with a type of traffic, such as time-sensitive traffic (e.g., a voice call).

In some embodiments, if the radio node ceases to function, the mobile gateway may create a new mobility tunnel between the other radio node and an additional radio node in the subnet as a keep-alive mechanism.

Moreover, in some embodiments, if a router in the local wireless network is configured to not forward multicast traffic between different subnets, the radio node may relay a paging request to another radio node in a different subnet using the X2 interface. This message may be relayed using a unicast transmission. Then, the receiving radio node may transmit a multicast paging request message to its IP subnet.

Furthermore, in some embodiments, the mobility gateway facilitates multicast traffic in a venue using LTE without accessing the core network of the mobile-network operator.

In some embodiments, instead of using the MAC address provided, in part, by the MME, the radio node binds the IP address of the electronic device, which is connected to the radio node to the MAC address of the radio node.

Additionally, in some embodiments, the MME provides the IP address when the electronic device attaches to the local wireless network. The radio node may act as a proxy (such as an ARP proxy) for each new IP address allocated by the MME. However, instead of using a dedicated MAC address when the electronic device is communicating with another electronic device in the local wireless network, the radio node may use its MAC address.

Another embodiment provides a computer-program product for use with the radio node. This computer-program product includes instructions for at least some of the operations performed by the radio node.

Another embodiment provides a method. This method includes at least some of the operations performed by the radio node.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A communication technique for providing a mobile gateway in a radio node (such as an eNodeB) in a local wireless network that is associated with a venue is described. During the communication technique, the radio node may provide, via the mobile gateway, cellular-telephone-network services in the venue without accessing a packet gateway or a service gateway in the cellular-telephone network (and, more generally, the core network of the mobile-network operator). In particular, when an electronic device attaches to the local wireless network, the mobile gateway may provide an Internet Protocol (IP) address to the electronic device based on a media access control (MAC) address for the electronic device, which is, in part, provided by a mobile management entity (MME) in a cellular-telephone network. This MAC address may facilitate the cellular-telephone services in the local wireless network. In particular, the mobile gateway may trigger, via a supported interface, pages to the electronic device when the electronic device is in idle (i.e., does not have an active connection) in the local wireless network in the venue. In addition, the mobile gateway in the radio node, in conjunction with one or more of a set of radio nodes in the local wireless network, may provide: a layer 2 (L2) bridge within a subnet in the local wireless network; and/or a layer 3 (L3) bridge via a mobility tunnel across subnets in the local wireless network.

By providing the cellular-telephone-network services in the local wireless network, the communication technique may facilitate offloading of traffic (such as packet-data-network traffic) from the cellular-telephone network to the local wireless network. For example, the cellular-telephone network may offload network support for traffic in the local wireless network and electronic-device mobility in the local wireless network from the cellular-telephone network (such as the MME) to the local wireless network. Consequently, the communication technique may reduce communication overhead, system complexity and the expense of implementing the local wireless network and running the cellular-telephone network. Therefore, the communication technique may increase customer satisfaction and loyalty.

We now describe some embodiments of the communication technique. A cellular-telephone network may include base stations (and associated cell towers) that implement so-called 'macrocells.' These macrocells may, e.g., facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

Because there are often gaps in the coverage offered by macrocells, some users operate local transceivers that provide short-range communication in the cellular-telephone network. In particular, many companies and entities (such as mass-transit or sporting venues) implement local wireless networks in venues (which are sometimes referred to as 'enterprise wireless networks') using sets of small cells. For example, the small cells may be implemented using radio access nodes or radio nodes, such as eNodeBs or eNBs. In principle, these 'enterprise wireless networks' can provide access to a cellular-telephone network with improved communication performance.

However, it can be difficult to implement some of the services that are usually available in a cellular-telephone network in an enterprise wireless network. In particular, mobile network operators of cellular-telephone networks and companies and entities that operate enterprise wireless networks (such as local area networks) often do not want to support many cellular-telephone-network services, such as L2 or L3 electronic-device mobility (e.g., within an IP subnet or seamlessly between IP subnets), in the enterprise wireless networks. Consequently, it can be difficult for user equipment (such as cellular telephones) to seamlessly transition within different subnets (i.e., from one eNB to another) or across subnets in an enterprise wireless network.

Typically, such user-equipment or electronic-device mobility requires the enterprise wireless network to route traffic back to the mobile network operator, so that the backend infrastructure in the cellular-telephone network can provide these services. This backhaul traffic increases the communication overhead, system complexity and the expense of implementing the enterprise wireless network and running the cellular-telephone network. However, mobile network operators often do not want to pay for backhaul of low-value Internet traffic to provide the cellular-telephone-network services in the enterprise wireless networks. Moreover, the companies and entities that operate enterprise wireless networks usually do not want to pay for additional hardware to implement the cellular-telephone-network services in the enterprise wireless networks.

The communication technique described below provides a cost-effective architecture for implementing cellular-telephone-network services in the enterprise wireless networks. This communication technique addresses several constraints/challenges, including that the user's electronic devices (such as cellular telephones) be unchanged and overcoming the lack of MAC addresses for electronic devices in enterprise wireless networks (which is an obstacle to using the existing wired switching/routing infrastructure to facilitate mobility and other cellular-telephone services in enterprise wireless networks). In particular, as described further below, the communication technique provides high availability by including at least some of the functions from a serving gateway (S-GW) and packet gateway (P-GW) (both from the 3rd Generation Partnership Project or 3GPP of Sophia Antipolis, Valbonne, France) in radio nodes in an enterprise wireless network. In addition, the communication technique may provide micro-mobility within the enterprise wireless network via the L2 and L3 bridges (within and across subnets, respectively) without requiring that traffic be backhauled to the cellular-telephone network.

In the discussion that follows, LTE (from the 3GPP) is used as an illustration of a communication protocol that is used during communication between one or more radio nodes and an electronic device. Consequently, eNodeBs or eNBs are used as illustrative examples of the radio nodes. However, a wide variety of communication techniques or protocols may be readily used for the various embodiments. For example, the communication technique may be used with LTE Wi-Fi (or an IEEE 802.11-compatible communication protocol) link aggregation (LWA), Universal Mobile Telecommunications System (UMTS), General Packet Radio Service (GPRS), etc. In addition, the wireless communication in the communication technique may occur in one or more bands of frequencies (or spectral bands). In some embodiments, the wireless communication in the communication technique occurs in the 3.5 GHz frequency band. Thus, the wireless communication may occur in a band of frequencies that is outside of or different from a cellular-telephone band of frequencies.

Figure 1:
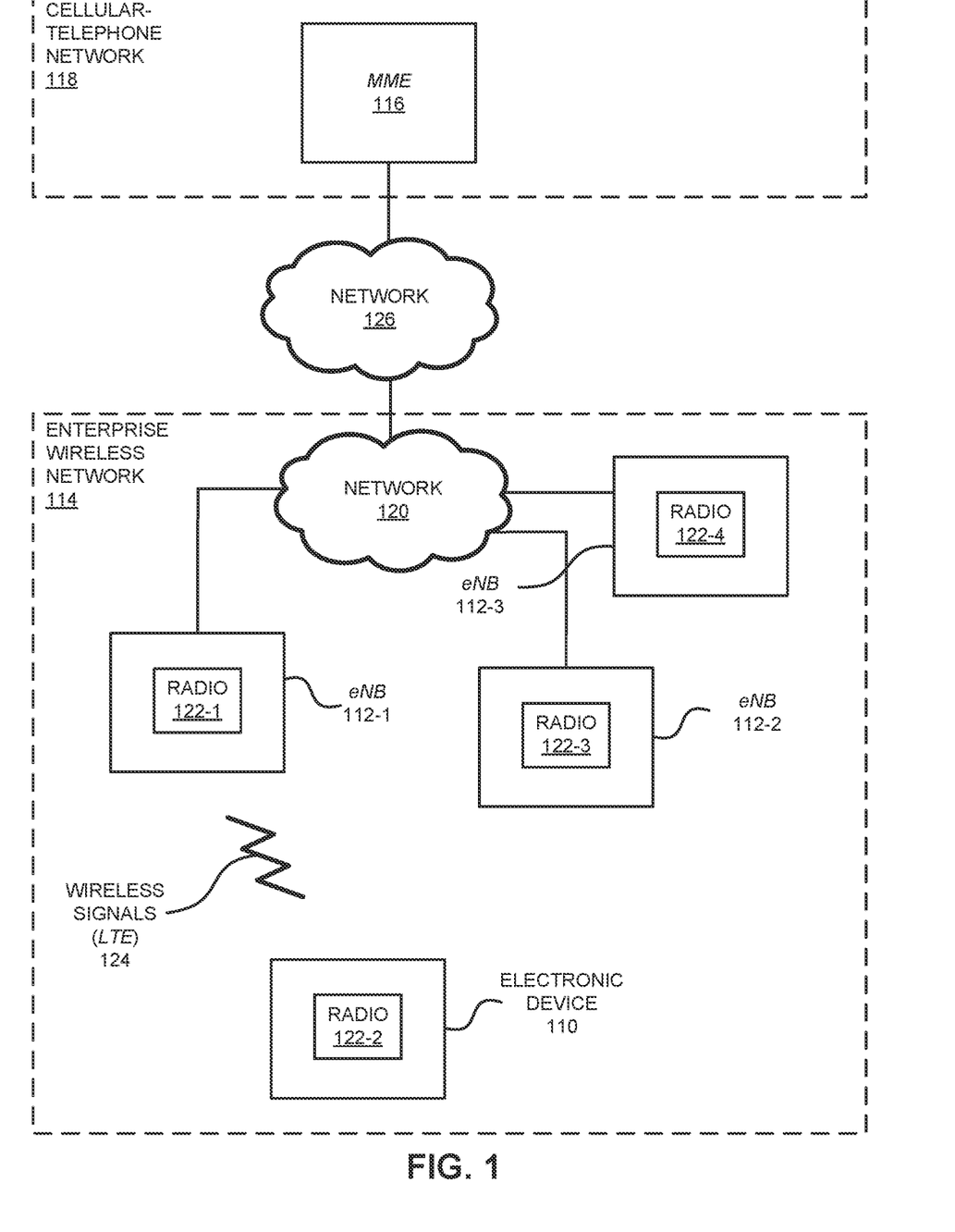
FIG. 1 is a block diagram illustrating electronic devices wirelessly communicating in accordance with an embodiment of the present disclosure.

Communication among electronic devices is shown in FIG. 1, which presents a block diagram illustrating an electronic device 110 (such as computers, portable electronic devices, e.g., cellular telephones, etc.) and eNBs 112 in an enterprise wireless network (EWN) 114, and an MME 116 in a cellular-telephone network 118 communicating according to some embodiments. eNBs 112 may provide wireless communication with one or more electronic devices (such electronic device 110) in enterprise wireless network 114, and may provide access to cellular-telephone network 118 (via switches, routers and/or a firewall) using IEEE 802.3 (which is sometimes referred to as 'Ethernet'). In particular, electronic device 110 and eNBs 112 may wirelessly communicate while: attaching to enterprise wireless network 114 and/or cellular-telephone network 118; establishing connections; transmitting pages to electronic devices in idle (i.e., without active connections) in enterprise wireless network 114; providing an L2 bridge within a subnet in enterprise wireless network 114; providing an L3 bridge across subnets in enterprise wireless network 114; enforcing quality-of-service policies; supporting lawful intercept of communication with electronic device 110; and/or transmitting uplink data and receiving downlink data via a cellular-telephone communication protocol (such as LTE). Moreover, eNBs 112 and MME 116 may communicate via network 120 (such as a local area network) and/or network 126 (such the Internet), either or both of which, in general, may involve wired and/or wireless communication.

Figure 7:
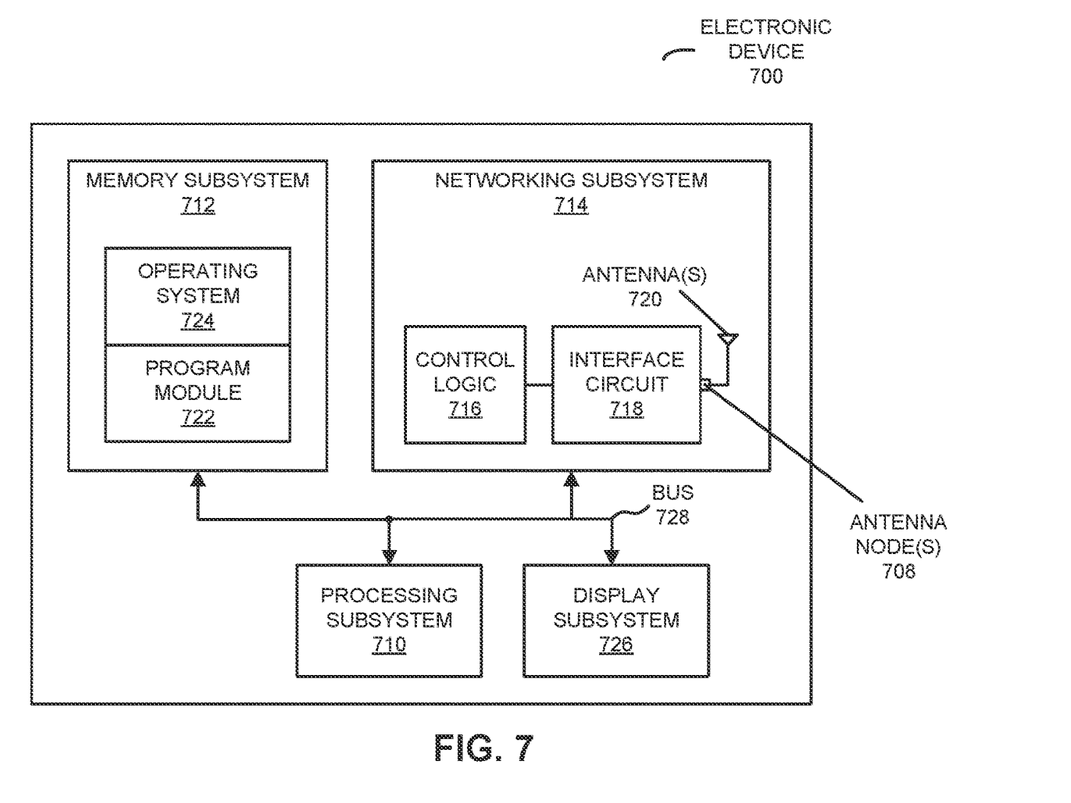
FIG. 7 is a block diagram illustrating an electronic device in accordance with an embodiment of the present disclosure.

As described further below with reference to FIG. 7, electronic device 110 and eNBs 112 may include subsystems, such as a networking subsystem, a memory subsystem and a processor subsystem. In addition, electronic device 110 and eNBs 112 may include radios 122 in the networking subsystems. More generally, electronic device 110 and eNBs 112 can include (or can be included within) any electronic devices with the networking subsystems that enable electronic device 110 and eNBs 112 to communicate with each other and/or other electronic devices, including wired and wireless communication. Note that while instances of radios 122 are shown in electronic device 110 and eNBs 112, one or more of these instances may be different from the other instances of radios 122.

As can be seen in FIG. 1, wireless signals 124 (represented by jagged lines) are transmitted from radio 122-1 in eNB 112-1. These wireless signals 124 may be received by radio 122-2 in electronic device 110. In particular, eNB 112-1 may transmit packets. In turn, these packets may be received by electronic device 110. Moreover, as described further below, eNB 112-1 may configure and/or allow other eNBs 112 to communicate with electronic device 110.

Note that the communication between electronic device 110, eNBs 112 and/or MME 116 (and, more generally, cellular-telephone network 118) may be characterized by a variety of performance metrics, such as: a received signal strength indicator (RSSI), a data rate, a user data rate discounting radio protocol overhead (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated maximum data rate (which is sometimes referred to as 'utilization').

In the described embodiments, processing a packet or frame in electronic device 110, eNBs 112 and/or MME 116 (and, more generally, cellular-telephone network 118) may include: receiving wireless signals 124 with the packet or frame; decoding/extracting the packet or frame from received wireless signals 124 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed further below with reference to FIGS. 2-6, a given one of eNBs 112 (such as eNB 112-1) may perform at least some of the operations in the communication technique. In particular, eNB 112-1 may implement a mobile gateway (or a mobile-enabled gateway). This mobile gateway may be a distributed component of the mobile-gateway functionality, such as functions specified in technical specification (TS) 23.401-v10 (from the 3GGP). These functions may include: assignment of an IP address to electronic device 110; support for a SGi interface; downlink and uplink data transfer between eNB 112-1 and enterprise wireless network 114 and/or cellular-telephone network 118; trigger paging of registered subscribers that do not have an active radio connection; enforcement of quality-of-service policies (which may be static or dynamic); and/or supporting lawful intercept of communication with electronic device 110. In conjunction with the mobile gateways in other eNBs 112, the mobile gateway in eNB 112-1 may implement L2 and L3 bridges or electronic-device mobility within a venue, i.e., within enterprise wireless network 114.

Figure 2:
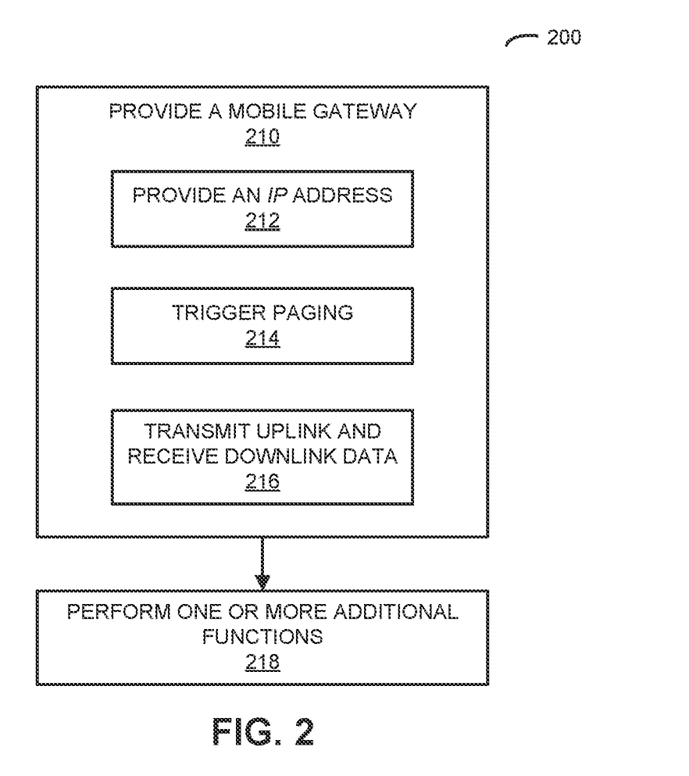
FIG. 2 is a flow diagram illustrating a method for providing cellular-telephone-network services in accordance with an embodiment of the present disclosure.

We now describe embodiments of the method. FIG. 2 is a flow diagram illustrating a method 200 for providing cellular-telephone-network services via a mobile gateway in a radio node (such as eNB 112-1) in a local wireless network according to some embodiments. During operation, the radio node provides a mobile gateway (operation 210), the mobile gateway may implement one or more functions. In particular, the mobile gateway may provide, when the electronic device attaches to the local wireless network, an IP address (operation 212) to the electronic device based on a MAC address for the electronic device, which is provided by a MME in the cellular-telephone network. For example, the MAC address may include an identifier associated with the MME and an M-TMSI that is assigned to the electronic device by the MME based on an IMSI of the electronic device. Note that the MAC address may be maintained by the radio node (thus, the radio node may maintain a local binding or relationship between the M-TMSI and the MAC address). In addition, the IP address may be provided using a Dynamic Host Configuration Protocol (such as RFC 2131).

Moreover, the mobile gateway may trigger, via a supported interface, paging (operation 214) to the electronic device when the electronic device is in idle (i.e., does not have an active connection) in the local wireless network. In particular, the interface may include an SGi interface. Alternatively, the interface may include an X2 interface, and the paging may involve forwarding a multicast page across subnet boundaries (which may be needed when the wired router is configured to not forward multicast paging frames across subnets). In addition, the paging may be triggered based on the M-TMSI and may be performed by a set of radio nodes in the local wireless network.

Furthermore, the mobile gateway may transmit uplink data and may receive downlink data (operation 216) via a cellular-telephone communication protocol. For example, the cellular-telephone communication protocol may include LTE.

In some embodiments, the mobile gateway may implement or perform one or more optional additional functions (operation 218), including: enforcing quality-of-service policies; and/or supporting lawful intercept of communication with the electronic device. Moreover, the mobile gateway may detect duplicate IP addresses and may defend the IP address of the electronic device when the electronic device is in idle in the local wireless network. Furthermore, the mobile gateway in the radio node, in conjunction with one or more of the set of radio nodes, may provide: a layer 2 (L2) bridge within a subnet in the local wireless network; and/or a layer 3 (L3) bridge across subnets in the local wireless network.

For example, the L2 bridge may involve the radio node (via the mobile gateway): requesting that the electronic device measure a received signal strength (such as a received signal strength indicator or RSSI) associated with another radio node in the local wireless network; receiving information specifying the received signal strength from the electronic device; and providing, via another interface, the MAC address and the IP address to the other radio node, so that the electronic device is handed over to the other radio node. Note that the other interface may include an X2 interface.

Alternatively, during communication of a data stream with the electronic device, the L3 bridge may involve the radio node (via the mobile gateway): providing, via another interface, the MAC address and the IP address to another radio node in a different subnet than that of the radio node in the local wireless network; receiving, from the other radio node, instructions to establish a mobility tunnel with the radio node in a subnet that includes the radio node; and forwarding traffic for the electronic device to the other radio node via the mobility tunnel. Note that the data stream may be associated with a type of traffic, such as time-sensitive traffic (e.g., a voice call). Thus, the L3 bridge may occur during the communication of time-sensitive traffic.

In some embodiments, the MAC address in method 200 are taken from another electronic device in the local wireless network. Moreover, while the disclosed embodiments re-use MAC addresses that were used exclusively on the Wi-Fi radio interfaces of the access point, note that these MAC addresses are never used on the wired network, so there is not a possibility of conflict. Furthermore, note that the access point may be at an arbitrary location (including in a box at a warehouse). Thus, the access point does not have to be deployed in order for their MAC addresses to be re-used.

In some embodiments of method 200, there may be additional or fewer operations. Moreover, the order of the operations may be changed, and/or two or more operations may be combined into a single operation.

Figure 3:
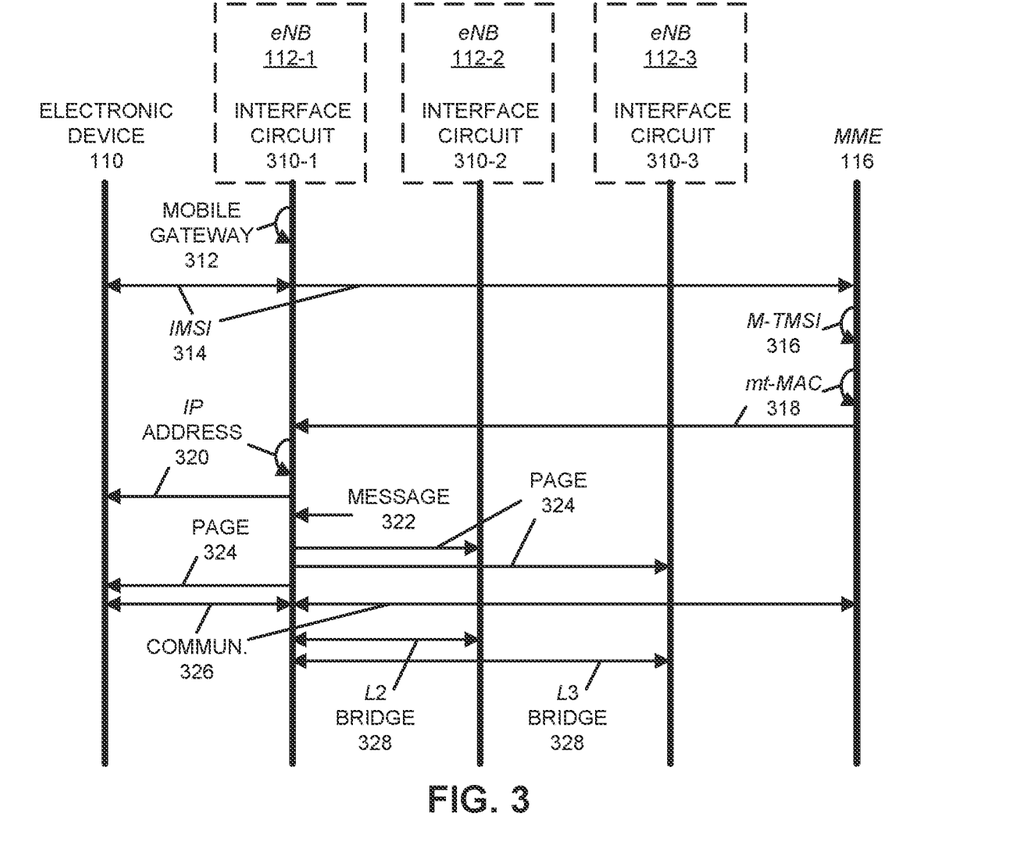
FIG. 3 is a drawing illustrating communication among the electronic devices in FIG. 1 in accordance with an embodiment of the present disclosure.

Embodiments of the communication technique are further illustrated in FIG. 3, which presents a drawing illustrating communication among electronic device 110, eNBs 112 and MME 116 according to some embodiments. In particular, interface circuit 310-1 in eNB 112-1 may execute software (or firmware) for a mobile gateway 312. When electronic device 110 attaches to a local wireless network (or attempts to establish an active connection), mobile gateway 312 may receive an IMSI 314 from electronic device 110, and may provide IMSI 314 to MME 116 so that MME 116 can authenticate and authorize electronic device 110 in a cellular-telephone network (and, thus, in the local wireless network). In response, MME 116 may generate (for or associated with electronic device 110) and provide an mt-MAC address 318, which includes an identifier associated with MME 116 and an M-TMSI 316, which is based on IMSI 314. Then, mobile gateway 312 may provide an IP address 320 to electronic device 110 based on mt-MAC address 318. Note that mobile gateway 312 may detect duplicate IP addresses in the local wireless network and may defend IP address 320 of electronic device 110 when electronic device 110 is in idle in the local wireless network.

If electronic device 110 is in idle in the local wireless network, when a message 322 is received for electronic device 110, mobile gateway 312 may provide a page 324 (separately from and/or in addition to other eNBs 112) based on M-TMSI 316 that is included in message 322.

Moreover, mobile gateway 312 may support communication 326 (uplink and downlink) with electronic device 110 and MME 116.

Furthermore, mobile gateway 312, in conjunction with one or more other eNBs 112, may provide: a L2 bridge 328 within a subnet in the local wireless network; and/or a L3 bridge 330 across subnets in the local wireless network.

Figure 4:
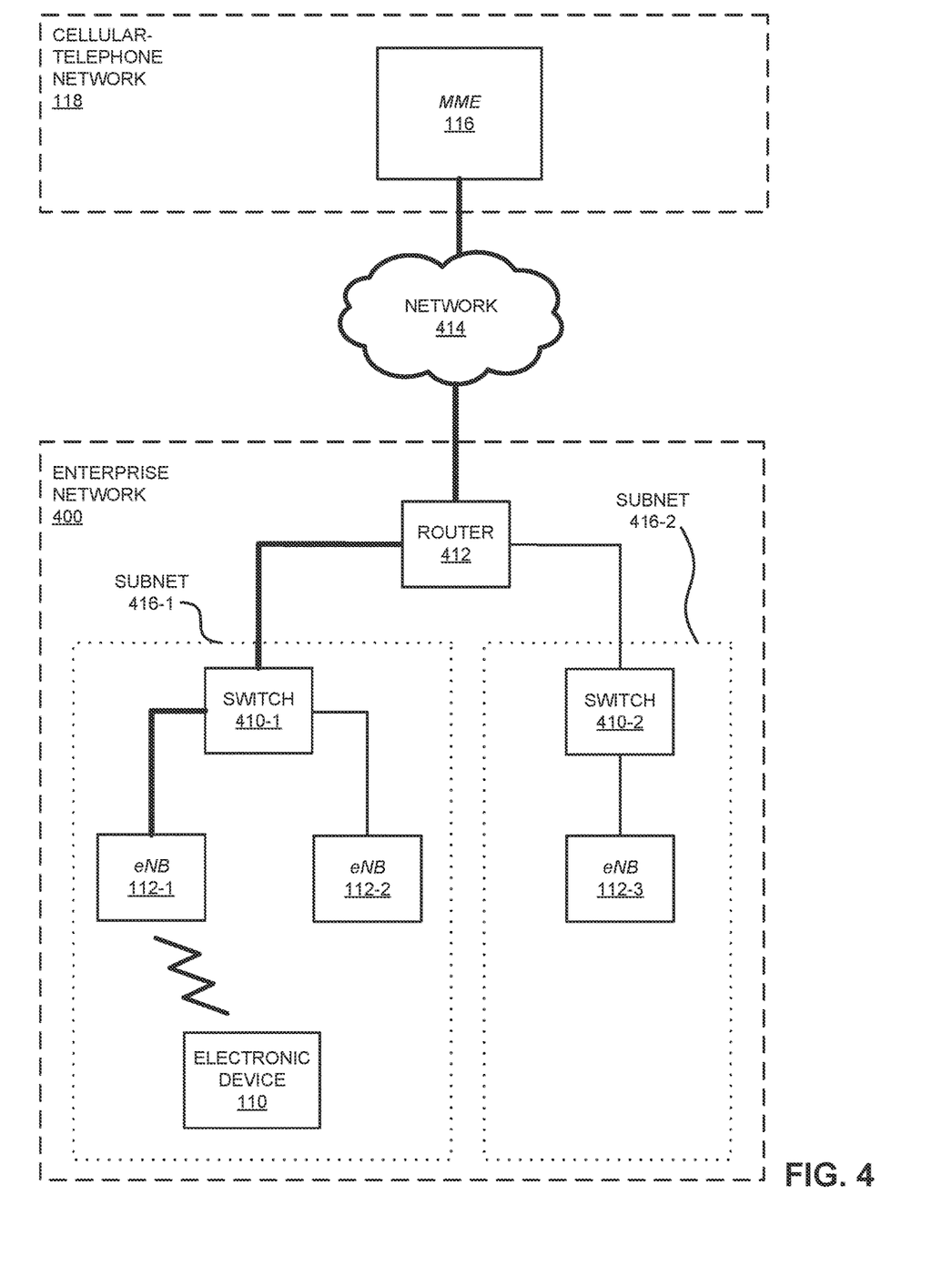
FIG. 4 is a block diagram illustrating a local wireless network in accordance with an embodiment of the present disclosure.

We now describe exemplary embodiments of the communication technique. FIG. 4 presents a block diagram illustrating an enterprise network 400 according to some embodiments. In FIG. 4, electronic device 110 wireless communicates with eNBs 112. These eNBs communicate with switches 410, router 412 (such as an edge router or a local area network router), a network 414 (such as the Internet) and MME 116 using wired communication. Note that one or more of eNBs 112 may be grouped into subnets 416 in the tracking area of enterprise network 400 (such as the area of or in a venue). Moreover, there may be a firewall between router 412 and network 414. Furthermore, each of eNBs 112 may have or include a distributed component of a mobile-gateway function (i.e., implements a distributed component of a mobile gateway, which interacts with other distributed components of mobile gateways in other eNBs 112 to implement the overall mobile gateway function).

When electronic device 110 attaches to enterprise network 400, MME 116 may allocate a MAC address (which is sometimes referred to as 'an mt-MAC'), which is used by wired infrastructure to forward frames to electronic device 110. The MAC address may include a fixed part (such as an identifier of MME 116) plus an M-TMSI assigned to electronic device 110 by MME 116.

On behalf of electronic device 110, one of eNBs 112 (such as eNB 112-1), which is a Dynamic Host Configuration Protocol client) may request an IP address from a local Dynamic Host Configuration Protocol server (not shown). In addition, MME 116 may relay subscriber permissions retrieved from a home subscriber server (HSS) in the cellular-telephone network during subscriber identity module (SIM) authentication flow to eNB 112-1 (via the mobile gateway). These permissions and other electronic-device-related metadata may stored on eNB 112-1 in an electronic-device or user-equipment control block (UCB).

Moreover, during a radio resource controller-idle procedure, MME 116 may retain the M-TMSI for electronic device 110. Moreover, the mobile gateway may retain the mt-MAC address assigned to electronic device 110. Furthermore, electronic device 110 may retain its IP address.

Furthermore, during an electronic-device detach procedure, the mobile gateway may release the mt-MAC address of electronic device 110 back into a 'pool' (i.e., for subsequent reuse). Moreover, the IP address of electronic device 110 may be released.

Additionally, during frame forwarding, eNB 112-1 may add/remove the mt-MAC address of electronic device 110 when forwarding uplink/downlink frames over the air, respectively.

Figure 5:
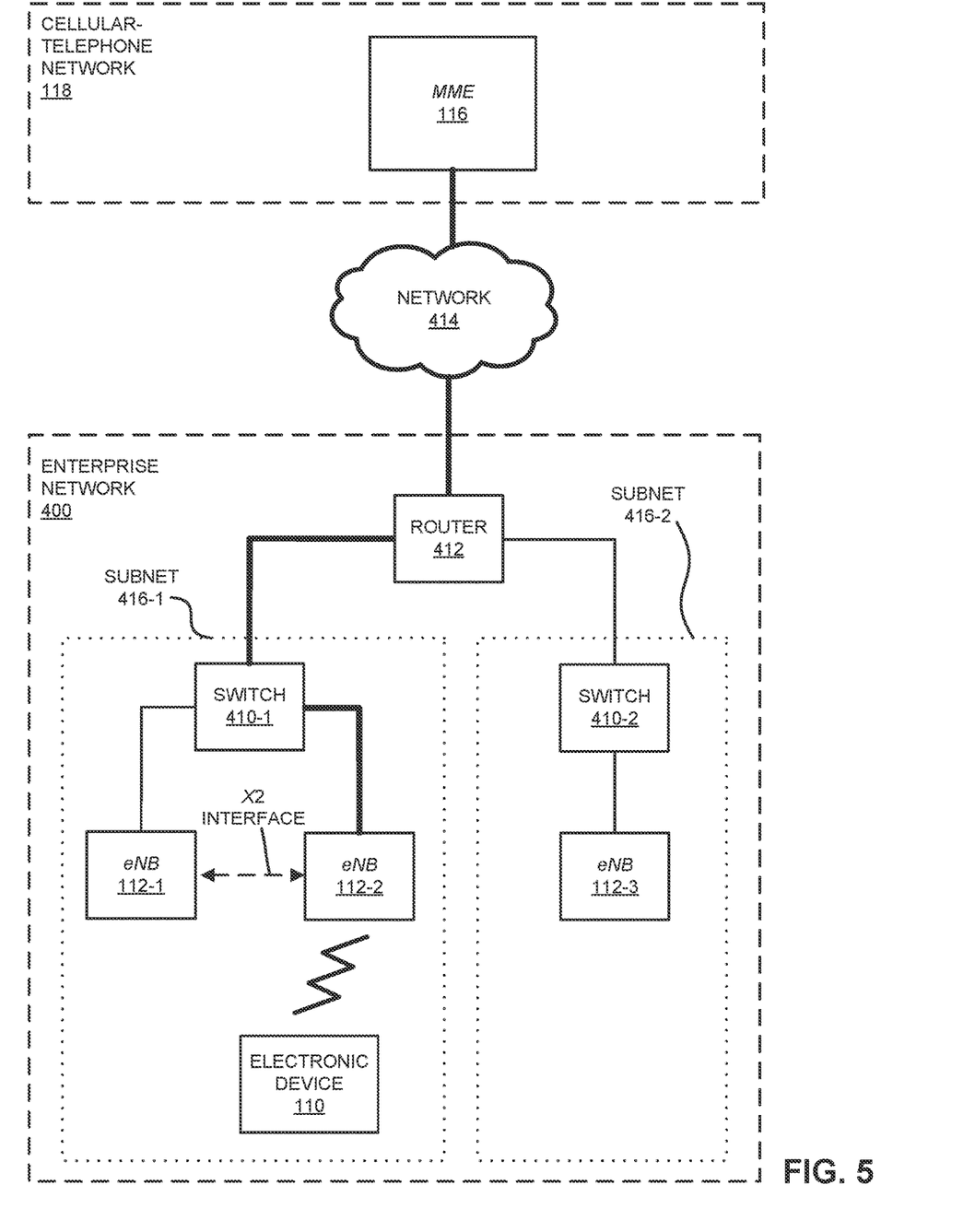
FIG. 5 is a block diagram illustrating a layer 2 (L2) bridge in the local wireless network of FIG. 4 in accordance with an embodiment of the present disclosure.

As noted previously, the mobile gateway may also provide an L2 bridge/mobility. This is shown in FIG. 5, which presents a block diagram illustrating an L2 bridge in enterprise network 400 according to some embodiments. This L2 bridge may involve eNB 112-1 (via the mobile gateway): requesting that electronic device 110 measure a received signal strength (such as a received signal strength indicator or RSSI, and, more generally, a communication-performance metric) associated with eNB 112-2 in subnet 416-1 in enterprise network 400; receiving information specifying the received signal strength from electronic device 110; and providing, via an interface (such as the X2 interface or an S1 interface), the MAC address and the IP address to eNB 112-2, so that electronic device 110 is handed over to eNB 112-2.

Thus, during an electronic-device handover, eNB 112-1 may pass the UCB via the X2 interface to a target eNB, such as eNB 112-2. Moreover, eNB 112-2 may transmit using a gratuitous address resolution protocol or GARP (which is used as an illustrative example) towards switch 410-1, which may cause switch 410-1 to update its hardware-based forwarding information base or forwarding table (FIB), i.e., the GARP may switch traffic to a different port. Note that router 412 may continue to forward frames towards or to electronic device 110, i.e., a destination address of a frame may be set to the mt-MAC address of electronic device 110. Consequently, in some embodiments, there may not be an update for router 412. In addition, note that electronic device 110 may retain the IP address and/or all application sessions.

Figure 6:
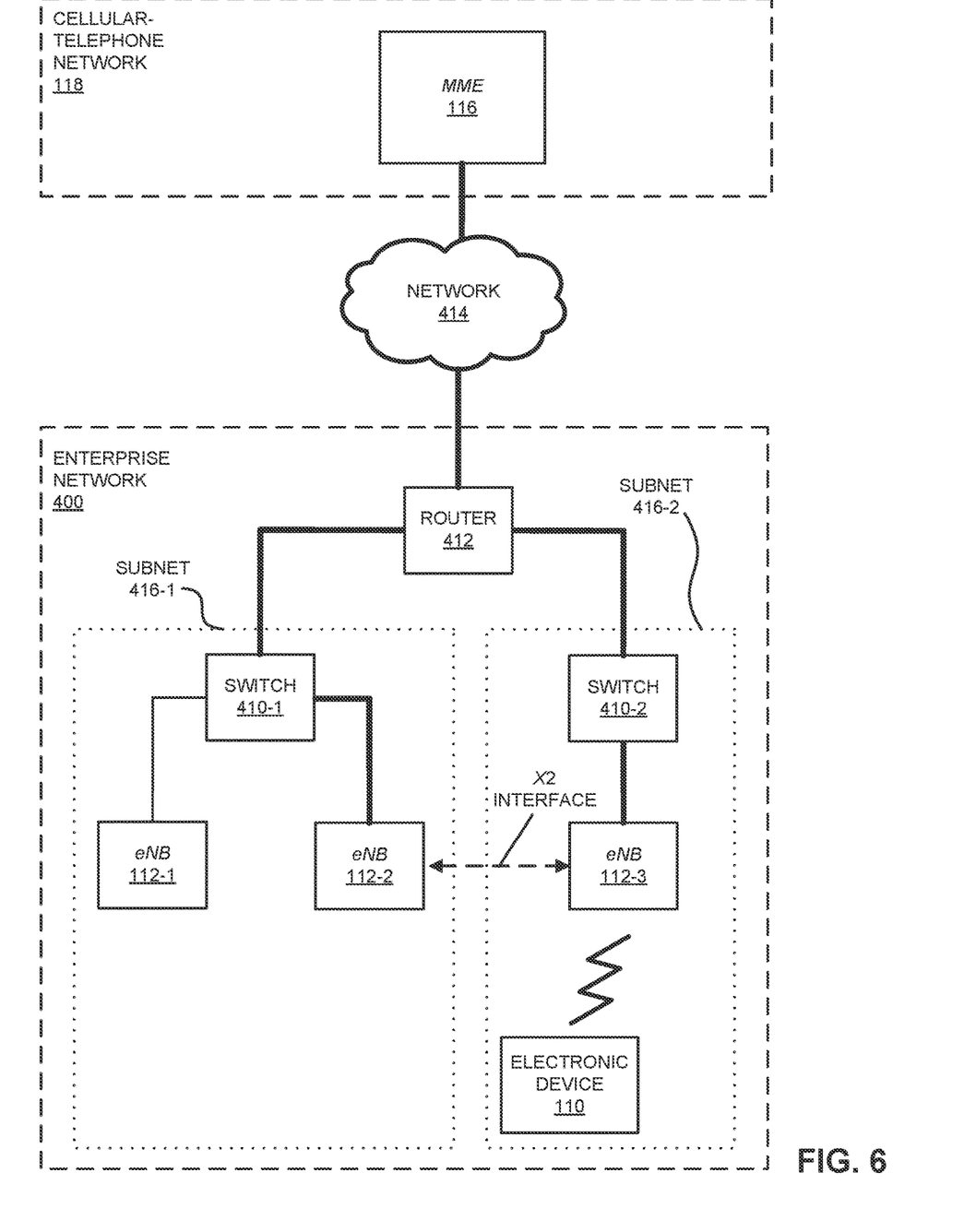
FIG. 6 is a block diagram illustrating a layer 3 (L3) bridge in the local wireless network of FIG. 4 in accordance with an embodiment of the present disclosure.

As noted previously, the mobile gateway may also provide an L3 bridge/mobility. This is shown in FIG. 6, which presents a block diagram illustrating an L3 bridge in enterprise network 400 according to some embodiments. In particular, during communication of a data stream with electronic device 110, the L3 bridge may involve eNB 112-1 (via the mobile gateway): providing, via an interface (such as the X2 interface), the MAC address and the IP address (i.e., the UCB) to eNB 112-3 in a different subnet 416-2 than subnet 416-1; receiving, from eNB 112-3, receiving instructions from eNB 112-3 to establish a mobility tunnel (such as Ethernet over IP, IP-to-IP or generic routing encapsulation) with eNB 112-1 in subnet 416-1; and forwarding traffic for electronic device 110 to eNB 112-3 via the mobility tunnel. In particular, the received traffic may be forwarded from eNB 112-2 to switch 410-1, to router 412, to switch 410-2 and then to eNB 112-3. Note that electronic device 110 may retain the IP address and/or all application sessions. Moreover, note that the UCB can also have a data structure to hold quality-of-service permissions, which are normally held and applied by a P-GW. Because, in the communication technique, a distributed component of the mobile gateway is implemented on an eNB, these quality-of-service permissions may need to be enforced on the eNB. Consequently, passing or distributing the UCB data structure to the target eNB during a handover may ensure that the quality-of-service permissions can continuously be applied.

The data stream during the L3 bridge may be associated with a type of traffic, such as time-sensitive traffic (e.g., a voice call). Thus, the L3 bridge may occur during the communication of time-sensitive traffic. For example, the L3 bridge may only occur during the communication the data stream and/or may only occur for time-sensitive traffic (such as a data stream associated with a voice phone call). Consequently, instead of performing a handover in the middle of a data stream (which could cause the traffic to fail), the L3 bridge (and the mobility tunnel) may be used. However, if the connection goes idle, a mobility tunnel may not be needed (unless, in some embodiments, there is a time-sensitive type of traffic, such as a voice phone call).

In some embodiments, in order to eliminate mobility tunnels, electronic device 110 may be 're-anchored' on a new IP subnet 416-2. For example, eNB 112-1 can advise MME 116 that electronic device 110 should be (or can be) re-anchored onto subnet 416-2. This approach may mitigate a so-called 'building ingress problem'. In particular, when electronic devices enter a building, they will all likely initially attach to the same eNB. Consequently, this approach may reduce the use of mobility tunnels.

Moreover, note that any of eNBs 112-1 and 112-2 in the original subnet 416-1 may be candidates for terminating a mobility tunnel, because distributing mobility tunnels can provide high availability. The distribution function could be random, based on a predefined pairing or pre-configured), etc. Note that all in-venue handovers may use the X2 interface.

In some embodiments, if eNBs 112-2 ceases to function, the mobile gateway may create a new mobility tunnel between eNBs 112-3 in subnet 416-2 and an additional eNB (such as eNBs 112-1) in subnet 416-1 as a keep-alive mechanism.

We now discuss options for managing the mt-MAC addresses. In the communication technique, the mt-MAC addresses may be locally administered. However, there is a very small, but non-zero probability of a collision (because information about other systems that are deployed in a venue and that are also using locally administered MAC addresses may not be known or available). In some embodiments, a separate virtual local area network (VLAN) may be used to address this challenge.

Alternatively or additionally, using a pool of MAC addresses that are allocated to previously manufactured Wi-Fi access points may guarantee that there are no collisions. Wi-Fi access points may use most of their MAC addresses as basic service set identifiers, which are never transmitted on the wire. Note that, because MME 116 may allocate the mt-MAC addresses, these approaches may imply modification of its M-TMSI allocation module.

We now further describe paging. When an electronic device is in a radio resource controller-idle state (i.e., it does not have an active radio connection with an eNB, but can be paged) and a downstream packet arrives at the local wireless network, the electronic device may be 'paged' by the eNBs to restore context. The electronic device may respond to the page by issuing a service request, which may result in a radio connection being re-established to a nearby eNB (it can be any eNB in the tracking area or venue).

In the 3GPP architecture, the packet may arrive at the S-GW, which in turn may inform the MME. Then, the MME may initiate a paging procedure via the eNB towards the electronic device.

Moreover, in the 3GPP architecture, employing a local gateway (L-GW) (i.e., for local traffic offload), when a packet arrives at the L-GW the L-GW may inform the S-GW. In turn, the S-GW may inform the MME, which may then initiate a paging procedure via the eNB towards the electronic device. In the local traffic offload embodiments, this may result in a lot of signaling overhead and functionally unnecessary traffic.

With the mobile-gateway (M-GW) architecture in the communication technique, when a downlink frame arrives at the local wireless network, it carries the M-TMSI of the electronic device (in particular, in the mt-MAC address allocated on behalf of the electronic-device communications). Therefore, because in order to transmit a paging message the eNB only needs the M-TMSI and some other locally available information, the eNB can initiate a paging procedure on its own (i.e., without the involvement of the MME and/or the S-GW)

The eNB may transmit a multicast 'paging request' message towards all the other eNB s in its IP subnet via a wired network because the electronic device may be 'camped on' an eNB other than the one the packet arrive at (because of user mobility in the local wireless network). Moreover, all eNBs in the subnet may initiate a paging procedure. Furthermore, the eNB that receives a service request from the paged electronic device may continue with the procedure.

If the venue (tracking area) is comprised of more than one IP subnet, the wired network can employ L3 multicast to ensure the all eNBs in the venue receive the paging request. Alternatively, an eNB may relay the paging request to a neighboring eNB in another IP subnet via the X2 interface. (For example, this may occur when router 412 in FIG. 6 is configured to not forward multicast traffic between different subnets 416.) Then, the receiving eNB may transmit a multicast paging request message to its IP subnet. Therefore, paging requests may be distributed by L2 and/or L3 multicast to all the radio nodes in the venue (which may be useful when an electronic device in idle mode moves within the venue due to user mobility). Note that the new serving eNB/MME can re-anchor the electronic device on a new IP subnet (e.g., using a packet-data-network disconnection request with reactivation cause code). Thus, there may not be a handover when the electronic device reattaches.

The mobile gateway may support IP multicast integrated with LTE MBMS (multimedia broadcast multicast services). Note that the multicast source may be a host on a local wired and/or wireless network in the venue or the Internet (if permitted by the wired infrastructure of the venue). Therefore, the mobile gateway may facilitate multicast traffic in a venue using LTE without accessing the core network of the mobile-network operator. For example, multicast traffic may be communicated from router 412 to one of eNBs 112 (such as eNB 112-1) in subnet 416-1 in FIG. 6 with an associated mt-MAC, and then eNB 112-1 may transmit the multicast traffic with subnet 416-1.

In some embodiments, because the electronic devices do not initially have MAC addresses in the local wireless network of a venue that uses a cellular-telephone communication protocol (such as LTE), there are at least two approaches for handling LTE traffic for the electronic devices at the eNBs in the local wireless network. As described previously, in one approach a fake MAC address (e.g., the mt-MAC) may be created per electronic device. Alternatively, the IP addresses of electronic devices that are connected to the same eNB may be binded to the MAC address of the eNB. In this approach, messages in the local wireless network (such as ARP messages) for the IP address of an electronic device contains the MAC address of the eNB. When an electronic device is attached, the eNB may advertise the new IP address with the local MAC address binding using ARP or GARP protocols.

Additionally, in some embodiments, the MME provides the IP address when the electronic device attaches to the local wireless network. An eNB may act as a proxy (such as an ARP proxy) for each new IP address allocated by the MME. However, instead of using a dedicated MAC address when the electronic device is communicating with another electronic device in the local wireless network, the eNB may use its MAC address. Note that the eNB may broadcast an ARP response as soon as new electronic device attaches and a new IP address may be allocated with its own MAC address. The eNB may also respond with its own MAC address whenever a new ARP request is received from an electronic device in the local wireless network.

We now describe embodiments of an electronic device, which may perform at least some of the operations in the communication technique. For example, the electronic device may include a mobile gateway in eNB 112-1 that performs the operations in FIG. 1 or electronic device 110 (which may perform counterparts to the operations in FIG. 2). FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720.) For example, networking subsystem 714 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, a transmit antenna radiation pattern of electronic device 700 may be adapted or changed using pattern shapers (such as reflectors) in one or more antennas 720 (or antenna elements), which can be independently and selectively electrically coupled to ground to steer the transmit antenna radiation pattern in different directions. Thus, if one or more antennas 720 includes N antenna-radiation-pattern shapers, the one or more antennas 720 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting frames and/or scanning for frames transmitted by other electronic devices.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used LTE and/or Ethernet communication protocols as an illustrative example, in other embodiments a wide variety of communication protocols and, more generally, communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 722, operating system 724 (such as a driver for interface circuit 718) or in firmware in interface circuit 718. Alternatively or additionally, at least some of the operations in the communication technique may be implemented in a physical layer, such as hardware in interface circuit 718.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
one or more antenna nodes configured to couple to an antenna; and
an interface circuit, coupled to the one or more antenna nodes, configured to communicate with an electronic device and a set of radio nodes in a local wireless network associated with a venue, and to communicate with a cellular-telephone network, wherein the interface circuit is further configured to provide a mobile gateway, and wherein the mobility gateway is configured to:
provide, via the mobile gateway and in conjunction with one or more of a set of radio nodes in the local wireless network, one of: a layer 2 (L2) bridge within a first subnet in the local wireless network; a layer 3 (L3) bridge across subnets in the local wireless network; or both, wherein the L2 bridge and the L3 bridge use an Internet Protocol (IP) address assigned to the electronic device by the radio node based at least in part on a media access control (MAC) address for the electronic device, which was, at least in part, provided by a mobile management entity (MME) in a cellular-telephone network.

2. The radio node of claim 1, wherein the MAC address comprises a fictitious MAC address.

3. The radio node of claim 1, wherein the MAC address comprises an identifier associated with the MME and a mobile temporary mobile subscriber identifier (M-TMSI) that is assigned to the electronic device by the MME based on an international mobile subscriber identifier (IMSI) of the electronic device.

4. The radio node of claim 1, wherein the L2 bridge comprises the radio node: providing, addressed to the electronic device, a request that the electronic device measure a received signal strength associated with another radio node in the local wireless network; receiving, associated with the electronic device, information specifying the received signal strength; and performing a handover to the other radio node by providing, via another interface and address addressed to the other radio node, the MAC address and an Internet Protocol (IP) of the electronic device.

5. The radio node of claim 4, wherein the other interface comprises an X2 interface.

6. The radio node of claim 1, wherein the L3 bridge comprises the radio node: providing, via another interface and addressed to another radio node in a different second subnet than the first subnet of the radio node in the local wireless network, the MAC address and an Internet Protocol (IP) address of the electronic device; receiving, associated with the other radio node, instructions to establish a mobility tunnel with the other radio node in the second subnet; and forwarding, via the mobility tunnel and addressed to the other radio node, traffic associated with a data stream for the electronic device.

7. The radio node of claim 6, wherein the data stream is associated with a type of traffic.

8. The radio node of claim 6, wherein the mobile gateway is configured to create a second mobility tunnel between the other radio node and an additional radio node in the first subnet as a keep-alive mechanism.

9. The radio node of claim 6, wherein, when a router in the local wireless network is configured to not forward multicast traffic between the subnets, the radio node is configured to relay a paging request to the other radio node in the second subnet using the other interface.

10. The radio node of claim 9, wherein the paging request is relayed using a unicast transmission.

11. The radio node of claim 1, wherein the mobility gateway is configured to transmit uplink data and receive downlink data via a cellular-telephone communication protocol.

12. The radio node of claim 11, wherein the radio node comprises an eNodeB and the cellular-telephone communication protocol comprises Long Term Evolution (LTE).

13. The radio node of claim 1, wherein the mobile gateway is configured to: enforce quality-of-service policies; or support lawful intercept of communication with the electronic device.

14. The radio node of claim 1, wherein the mobile gateway is configured to communicate multicast traffic in the venue using a cellular-telephone communication protocol without accessing a core network of a mobile-network operator of the cellular-telephone network.

15. A non-transitory computer-readable storage medium for use in conjunction with a radio node, the computer-readable storage medium storing program instructions that, when executed by the radio node, causes the radio node to provide cellular-telephone-network services in a local area network associated with a venue by performing one or more operations comprising:
providing a mobile gateway, the mobile gateway implementing functions comprising:
providing, via the mobile gateway in the radio node and in conjunction with one or more of a set of radio nodes in the local wireless network, one of: a layer 2 (L2) bridge within a subnet in the local wireless network; a layer 3 (L3) bridge across subnets in the local wireless network; or both, wherein the L2 bridge and the L3 bridge use an Internet Protocol (IP) address assigned to the electronic device by the radio node based at least in part on a media access control (MAC) address for the electronic device, which was, at least in part, provided by a mobile management entity (MME) in a cellular-telephone network.

16. The non-transitory computer-readable storage medium of claim 15, wherein the L2 bridge comprises the radio node: providing, addressed to the electronic device, a request that the electronic device measure a received signal strength associated with another radio node in the local wireless network; receiving, associated with the electronic device, information specifying the received signal strength; and performing a handover to the other radio node by providing, via another interface and address addressed to the other radio node, the MAC address and an Internet Protocol (IP) of the electronic device.

17. The non-transitory computer-readable storage medium of claim 15, wherein the L3 bridge comprises the radio node: providing, via another interface and addressed to another radio node in a different second subnet than the first subnet of the radio node in the local wireless network, the MAC address and an Internet Protocol (IP) address of the electronic device; receiving, associated with the other radio node, instructions to establish a mobility tunnel with the other radio node in the second subnet; and forwarding, via the mobility tunnel and addressed to the other radio node, traffic associated with a data stream for the electronic device.

18. A method for providing cellular-telephone-network services in a local area network associated with a venue, the method comprising:
by a radio node:
providing a mobile gateway, the mobile gateway implementing functions comprising:
providing, via the mobile gateway in the radio node and in conjunction with one or more of a set of radio nodes in the local wireless network, one of: a layer 2 (L2) bridge within a subnet in the local wireless network; a layer 3 (L3) bridge across subnets in the local wireless network; or both, wherein the L2 bridge and the L3 bridge use an Internet Protocol (IP) address assigned to the electronic device by the radio node based at least in part on a media access control (MAC) address for the electronic device, which was, at least in part, provided by a mobile management entity (MME) in a cellular-telephone network.

19. The method of claim 18, wherein the L2 bridge comprises the radio node: providing, addressed to the electronic device, a request that the electronic device measure a received signal strength associated with another radio node in the local wireless network; receiving, associated with the electronic device, information specifying the received signal strength; and performing a handover to the other radio node by providing, via another interface and address addressed to the other radio node, the MAC address and an Internet Protocol (IP) of the electronic device.

20. The method of claim 18, wherein the L3 bridge comprises the radio node: providing, via another interface and addressed to another radio node in a different second subnet than the first subnet of the radio node in the local wireless network, the MAC address and an Internet Protocol (IP) address of the electronic device; receiving, associated with the other radio node, instructions to establish a mobility tunnel with the other radio node in the second subnet; and forwarding, via the mobility tunnel and addressed to the other radio node, traffic associated with a data stream for the electronic device.

* * * * *